(12) United States Patent
Su

(10) Patent No.: US 12,004,498 B1
(45) Date of Patent: Jun. 11, 2024

(54) BIONIC BAIT

(71) Applicant: SHUAN YEW ENTERPRISE CO., LTD., Changhua County (TW)

(72) Inventor: Yuan-Chieh Su, Changhua County (TW)

(73) Assignee: Shuan Yew Enterprise Co., Ltd., Huatan Township (TW)

( * ) Notice: Subject to any disclaimer, the term of this patent is extended or adjusted under 35 U.S.C. 154(b) by 67 days.

(21) Appl. No.: 18/066,719

(22) Filed: Dec. 15, 2022

(51) Int. Cl.
*A01K 85/00* (2006.01)

(52) U.S. Cl.
CPC ................................ *A01K 85/1811* (2022.02)

(58) Field of Classification Search
CPC ...... A01K 85/00; A01K 85/011; A01K 85/18; A01K 85/1811
See application file for complete search history.

(56) References Cited

U.S. PATENT DOCUMENTS

| | | | | |
|---|---|---|---|---|
| 1,109,439 A * | 9/1914 | Maus | ..................... | A01K 85/18 43/42.22 |
| 10,736,307 B1 * | 8/2020 | Moore | ................... | A01K 85/16 |
| 2006/0059767 A1 * | 3/2006 | Tsai | ....................... | A01K 85/16 43/42.15 |
| 2007/0175083 A1 * | 8/2007 | Wilson | ................... | A01K 85/00 43/42.15 |
| 2009/0307959 A1 * | 12/2009 | Hughes | ................... | A01K 85/18 43/42.32 |
| 2016/0366865 A1 * | 12/2016 | Micelli | ................... | A01K 85/18 |

* cited by examiner

*Primary Examiner* — Richard G Davis
(74) *Attorney, Agent, or Firm* — Wang Law Firm, Inc.

(57) ABSTRACT

A bionic bait includes a bait body including an imitation trunk including a spine sheet including ribs at each of two opposite lateral surfaces thereof. Each rib extends along a longitudinal direction and has a first surface and a second surface opposite to the first surface in a transversal direction. The first surface has first protrusions and a first valley between every two adjacent ones of the first protrusions. The second surface has second protrusions and a second valley between every two adjacent ones of the second protrusions. The first protrusions of a respective rib can enter into the second valleys of an adjacent rib, and the second protrusions of the adjacent rib can enter into the first valleys of the respective rib. The respective rib allows the adjacent rib to rest thereon. Therefore, the bionic bait in the flow can swing like a live fish.

10 Claims, 8 Drawing Sheets

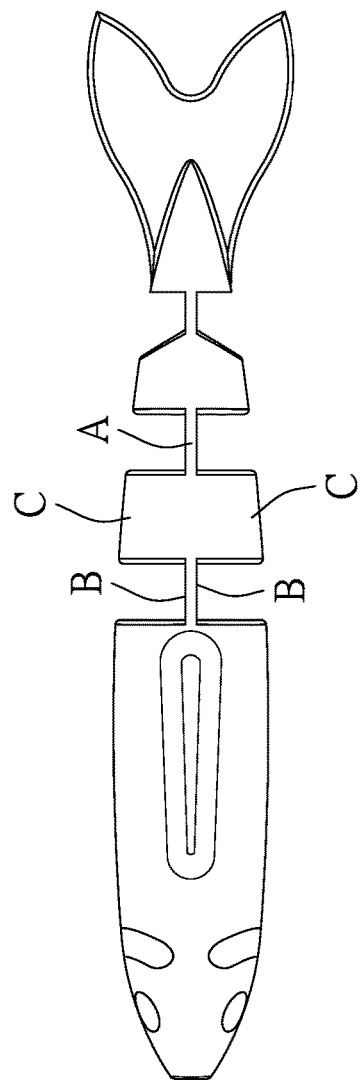
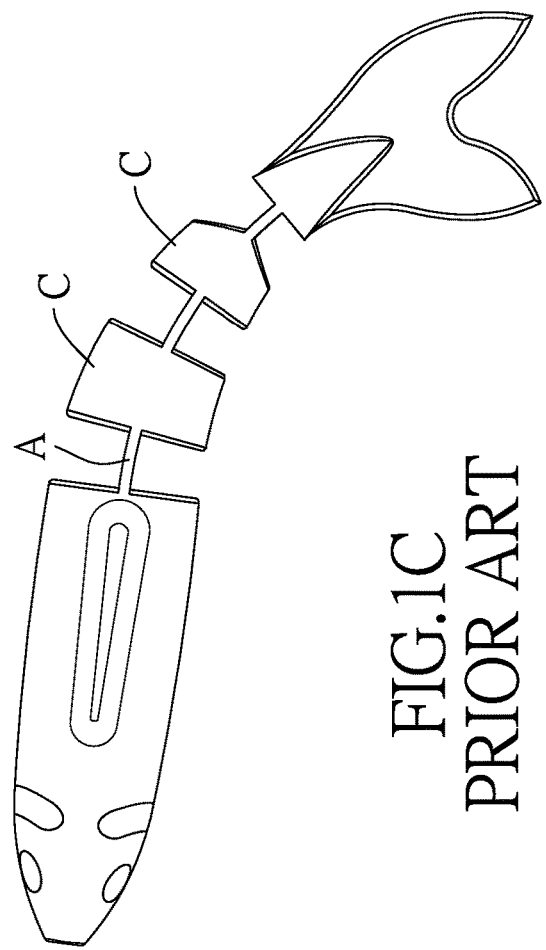
FIG.1B
PRIOR ART
FIG.1C
PRIOR ART

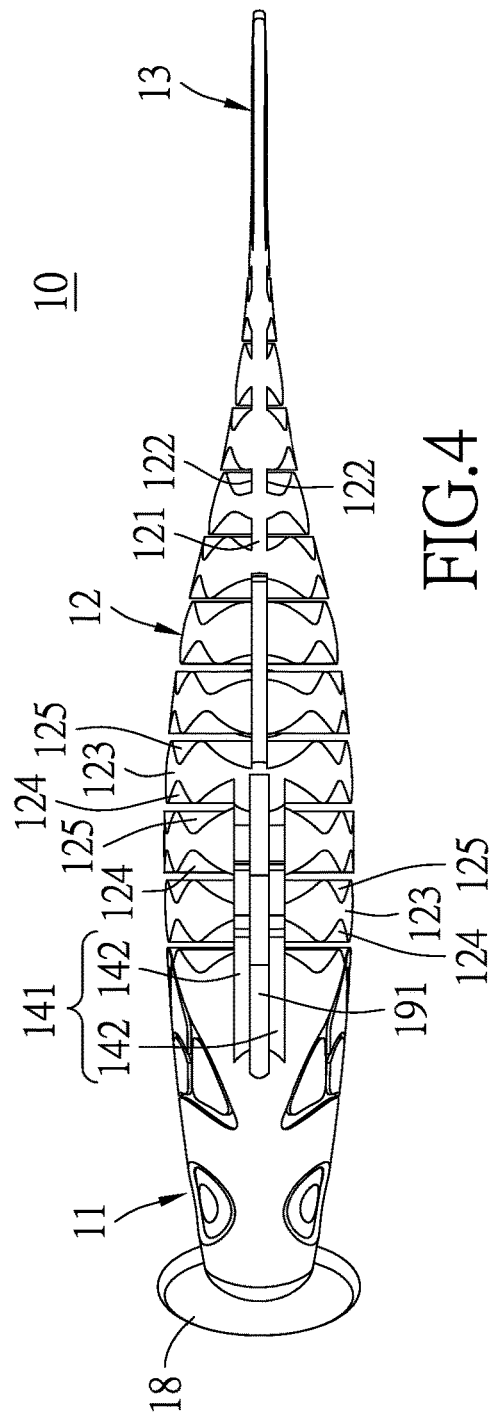
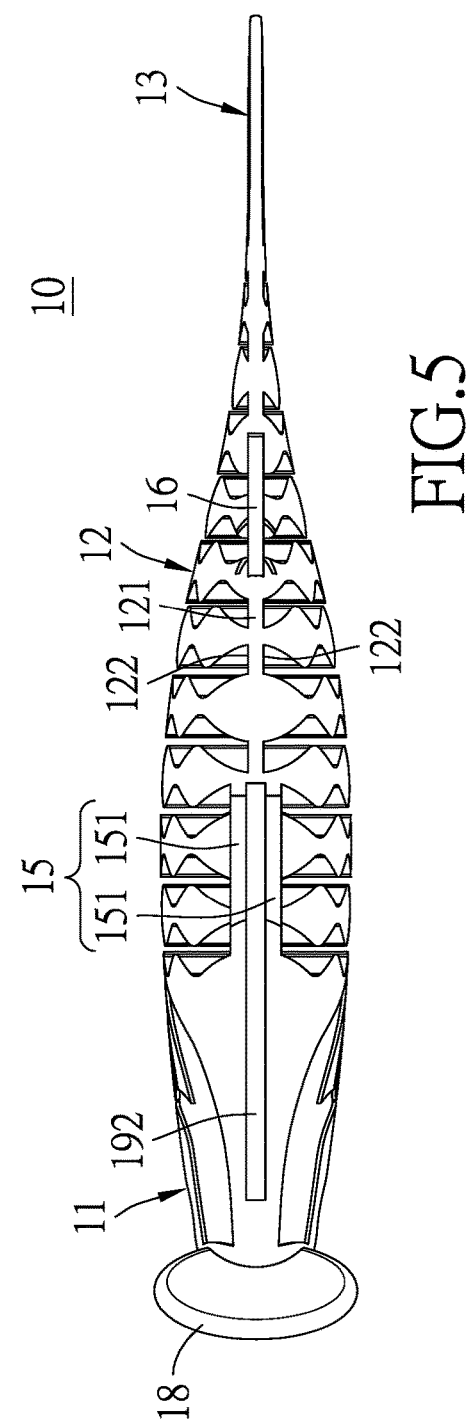

BIONIC BAIT

BACKGROUND

Field of the Invention

The present invention relates to a bait, and more particularly to a bionic bait.

Description of Related Art

The existing bionic bait, as shown in FIGS. 1A to 1C, is provided with a plurality of ribs C on two opposite sides B of the spine sheet A. However, because every two adjacent ribs C on the same side are too far apart in the transverse direction, it is difficult for the two adjacent ribs C to support and limit each other. Therefore, not only is the rear half of the bionic bait easy to sag in the longitudinal direction, but also the swing of the bionic bait in the transverse direction is unnatural.

Another existing bionic bait, as shown in FIGS. 2A to 2C, is provided with a plurality of fish scale imitation blocks D on two opposite sides B of the spine sheet A. However, every two adjacent fish scale imitation blocks D on the same side are out of alignment, so that the adjacent fish scale imitation blocks D have insufficient strength to support and limit each other in the longitudinal and transverse directions. Therefore, the longer the bionic bait is, the easier the rear half of the bionic bait overly sags in the longitudinal direction, and the more unnatural the swing of the bionic bait in the transverse direction.

SUMMARY

The invention aims to solve the problem that the protrusions of the bionic bait cannot provide sufficient support and limit forces to each other in the longitudinal and transverse directions.

For this reason, the objective of the present invention is to provide a bionic bait with the design of a lateral surface structure, whereby protrusions of the bionic bait have sufficient strength to support and limit each other in the longitudinal and transverse directions, so that even if the length of the bionic bait is relatively long, the rear half of the bionic bait will not sag excessively in the longitudinal direction, and the bionic bait will swing naturally in the transverse direction.

A bionic bait in accordance with an embodiment of the invention includes: a bait body including an imitation trunk, the imitation trunk including a spine sheet, and a plurality of ribs at each of two opposite lateral surfaces of the spine sheet, each of the ribs extending along a longitudinal direction and including, in a transverse direction, a first surface and a second surface opposite to the first surface, the first surface being provided with a plurality of first protrusions and a first valley between every two adjacent ones of the plurality of first protrusions, and the second surface being provided with a plurality of second protrusions and a second valley between every two adjacent ones of the plurality of second protrusions, wherein the plurality of first protrusions of each of the plurality of ribs are capable of entering into the second valleys of an adjacent one of the plurality of rib, the first valleys of each of the plurality of ribs allow the plurality of second protrusions of an adjacent one of the plurality of ribs to enter thereinto, and each of the plurality of ribs allows an adjacent one of the plurality of ribs to rest thereon.

Optionally, each of the plurality of first protrusions includes a first upper support surface and a first lower support surface, an angle between the first upper support surface and the first lower support surface is greater than 0 degree and less than 180 degrees, each of the plurality of second protrusions includes a second upper support surface and a second lower support surface, and an angle between the second upper support surface and the second lower support surface is greater than 0 degree and less than 180 degrees.

Optionally, two adjacent ones of the plurality of ribs are defined as a first rib and a second rib, and when the first rib and the second rib abut against each other, the first upper support surface of at least one of the plurality of first protrusions of the first rib abuts against the second lower support surface of at least one of the plurality of second protrusions of the second rib or the first lower support surface of at least one of the plurality of first protrusions of the first rib abuts against the second upper support surface of at least one of the plurality of second protrusions of the second rib.

Optionally, the bait body further includes an imitation head disposed at a front end of the imitation trunk.

Optionally, the bait body further includes a resistance member, which is disposed on the imitation head.

Optionally, the bait body further includes at least one selected from an imitation tail fin, an imitation dorsal fin, an imitation pelvic fin, an imitation anal fin and a pair of imitation pectoral fins, the imitation dorsal fin is disposed on a top of the imitation trunk, the imitation tail fin is disposed at a rear end of the imitation trunk, the imitation pelvic fin and the imitation anal fin are disposed at a bottom of the imitation trunk, and the pair of imitation pectoral fins is respectively disposed at two opposite sides of the imitation trunk.

Optionally, the bait body further includes at least one accommodation groove.

Optionally, the accommodation groove is located in the imitation trunk.

Optionally, the bait body further includes an imitation dorsal fin, the imitation dorsal fin is disposed on a top of the imitation trunk and includes two dorsal fin pieces, and the accommodation groove is disposed at the top of the imitation trunk and at least partially located between the two dorsal fin pieces.

Optionally, the bait body further includes an imitation pelvic fin, the imitation pelvic fin is located at a bottom of the imitation trunk and includes two pelvic fin pieces, and the accommodation groove is located at the bottom of the imitation trunk and at least partially located between the two pelvic fin pieces.

Optionally, the bait body is made of elastic material.

BRIEF DESCRIPTION OF THE DRAWINGS

After studying the detailed description in conjunction with the following drawings, other aspects and advantages of the present invention will be discovered:

FIG. 1B is a top view of the bionic bait in FIG. 1A when it is still;

FIG. 1C is a top view of the bionic bait in FIG. 1A when it is swinging;

FIG. 4 is a top view of the bionic bait in FIG. 3 when it is still;

FIG. 5 is a bottom view of the bionic bait in FIG. 3 when it is still;

DETAILED DESCRIPTION

Figure 1A:
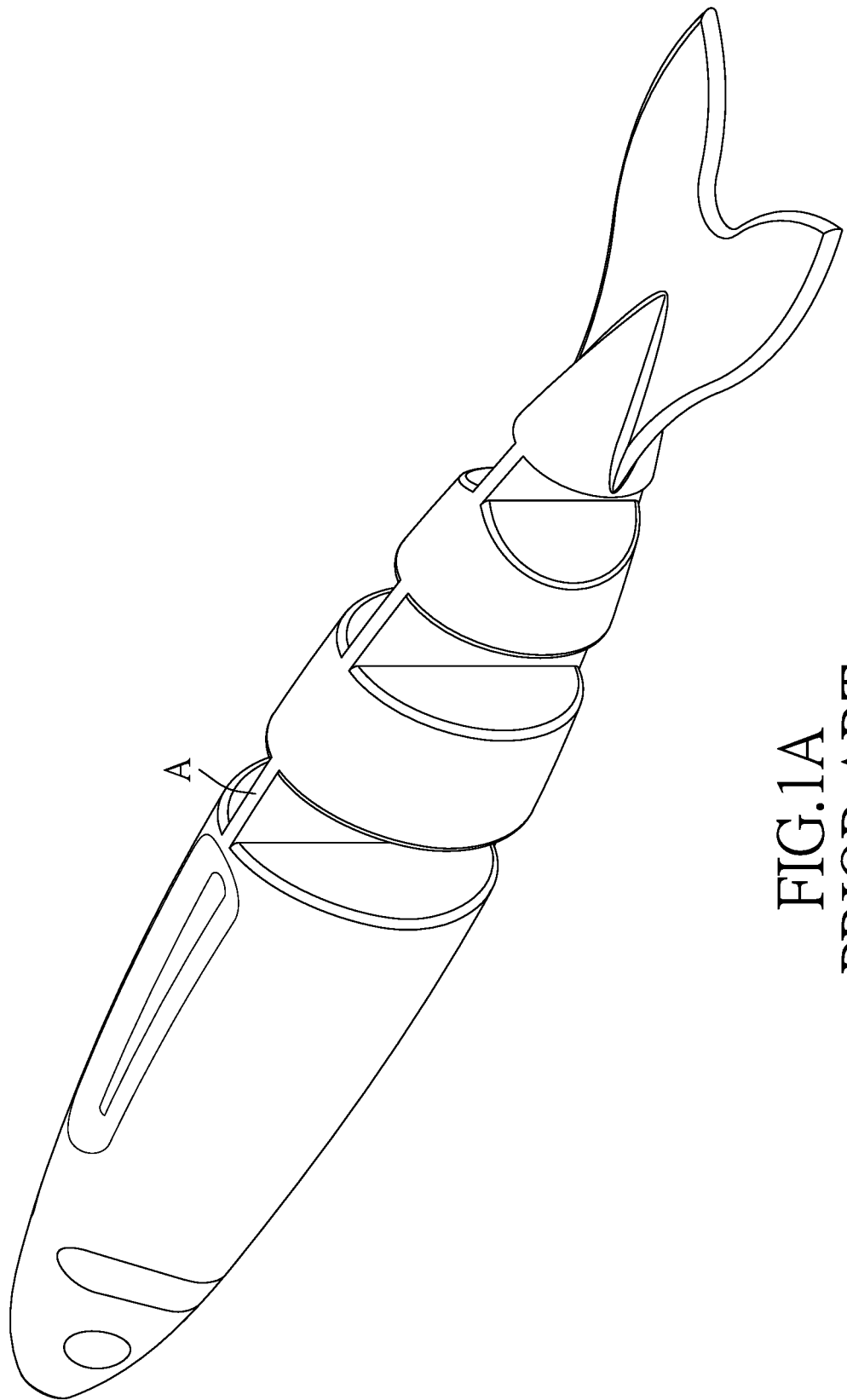
FIG. 1A is a schematic diagram of a conventional bionic bait.
Figure 2A:
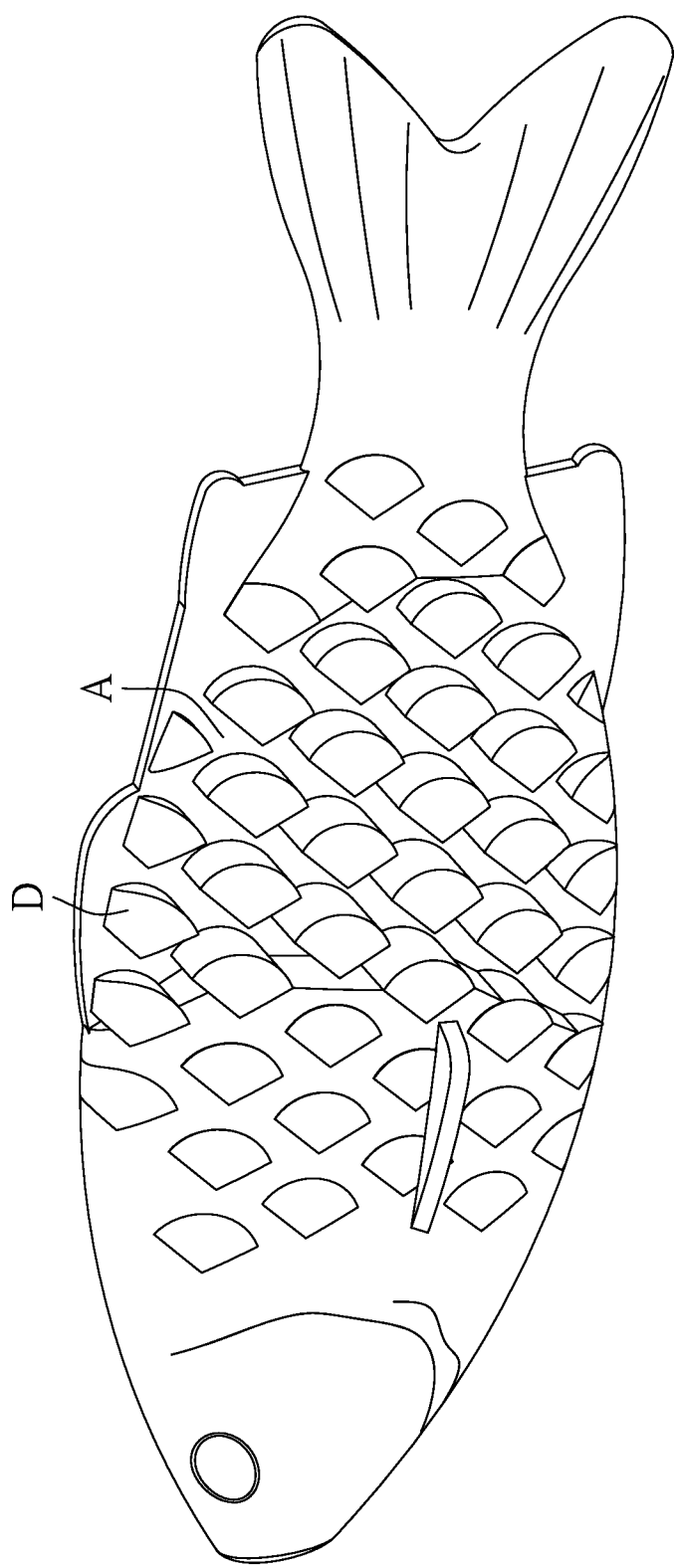
FIG. 2A is a schematic diagram of another conventional bionic bait.
Figure 2B:
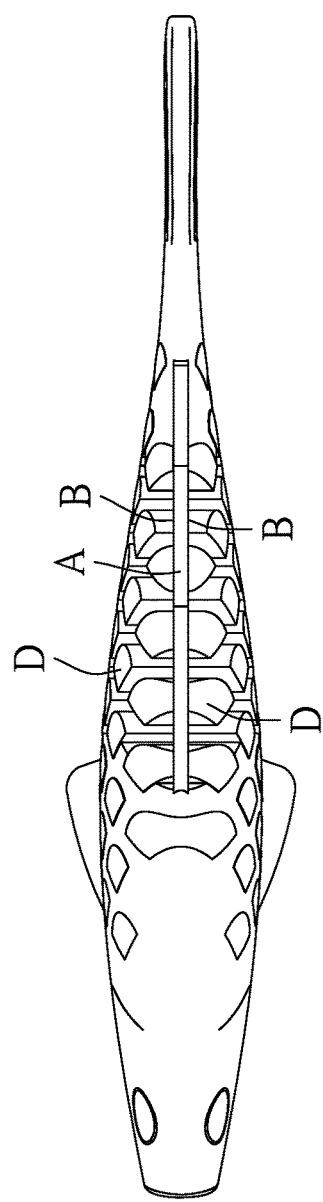
FIG. 2B is a top view of the bionic bait in FIG. 2A when it is still.
Figure 2C:
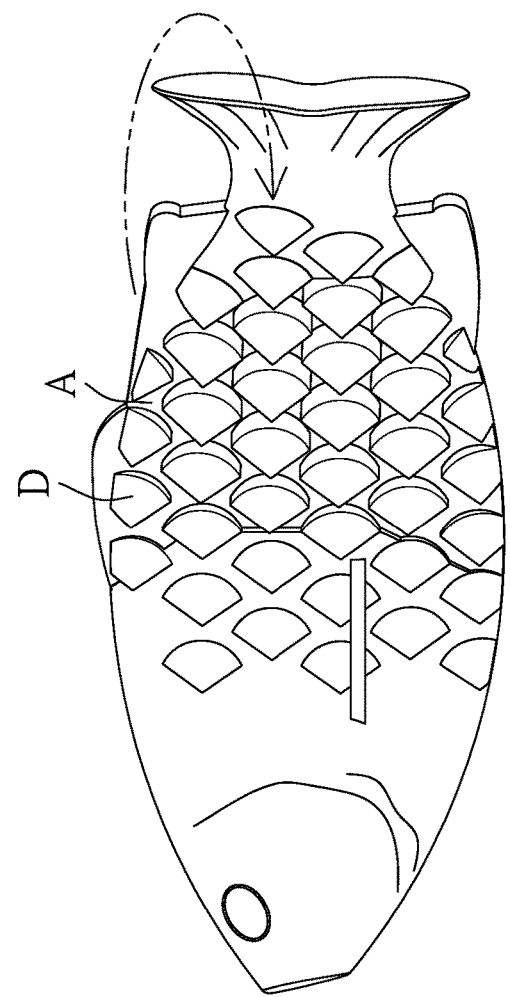
FIG. 2C is a side view of the bionic bait in FIG. 2A when it is swinging.
Figure 3:
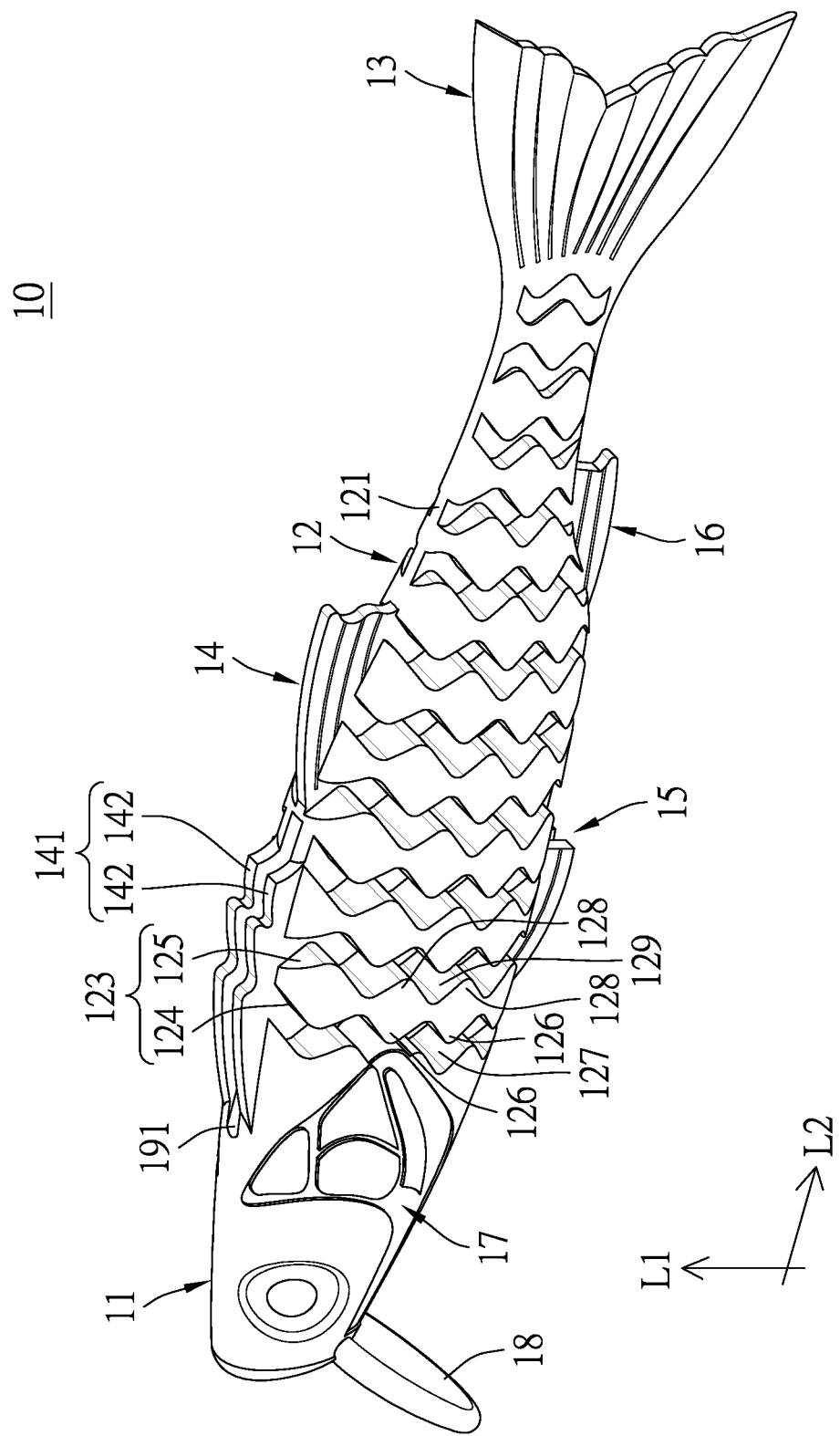
FIG. 3 is a schematic diagram of a bionic bait according to an embodiment of the present invention.
Figure 6:
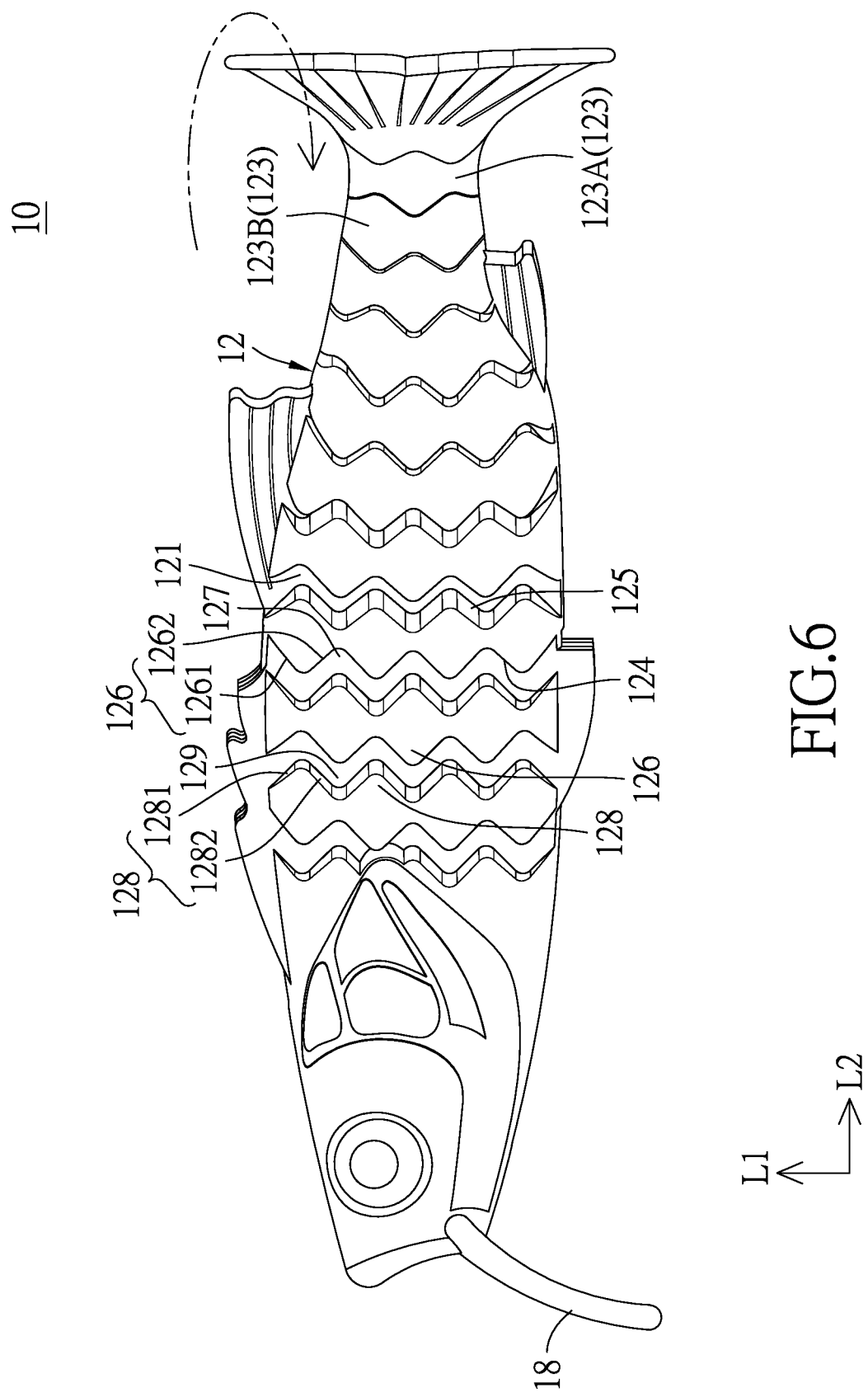
FIG. 6 is a side view of the bionic bait in FIG. 3 when it is swinging.

Referring to FIGS. 3 to 6, a bionic bait according to an embodiment of the invention includes a bait body 10. The bait body 10 includes an imitation head 11, an imitation trunk 12, an imitation tail fin 13, an imitation dorsal fin 14, an imitation pelvic fin 15, an imitation anal fin 16 and two imitation pectoral fins 17.

The imitation head 11 is disposed at the front end of the imitation trunk 12, and the imitation tail fin 13 is disposed at the rear end of the imitation trunk 12. The imitation dorsal fin 14 is disposed on the top of the imitation trunk 12. The imitation pelvic fin 15 and the imitation anal fin 16 are disposed at the bottom of the imitation trunk 12, and the two imitation pectoral fins 17 are respectively disposed at two opposite sides of the imitation trunk 12.

The imitation trunk 12 includes a spine sheet 121 and a plurality of ribs 123 at each of two opposite lateral surfaces 122 of the spine sheet 121. Each of the ribs 123 extends along a longitudinal direction L1 and includes, in a transverse direction L2, a first surface 124 and a second surface 125 opposite to the first surface 124. The first surface 124 is provided with a plurality of first protrusions 126 and a first valley 127 between every two adjacent ones of the first protrusions 126. The second surface 125 is provided with a plurality of second protrusions 128 and a second valley 129 between every two adjacent ones of the second protrusions 128. On each lateral surface 122, the first protrusions 126 of each rib 123 correspond to the second valleys 129 of an adjacent rib 123, respectively; and each first protrusion 126 of each rib 123 can enter into the corresponding second valley 129 of the adjacent rib 123, and the second protrusion 128 of each rib 123 can enter into the corresponding first valley 127 of the adjacent rib 123.

Each of the first protrusions 126 includes a first upper support surface 1261 and a first lower support surface 1262, and an angle between the first upper support surface 1261 and the first lower support surface 1262 is greater than 0 degree and less than 180 degrees. Each of the second protrusions 128 includes a second upper support surface 1281 and a second lower support surface 1282, and an angle between the second upper support surface 1281 and the second lower support surface 1282 is greater than 0 degree and less than 180 degrees. On the same rib 123, at least one first protrusion 126 and one second protrusion 128 adjacent to this first protrusion 126 in the transverse direction L2 can jointly form a diamond or rectangular block; and however, the invention is not limited to this shape of the block and the number of blocks.

Figure 7:
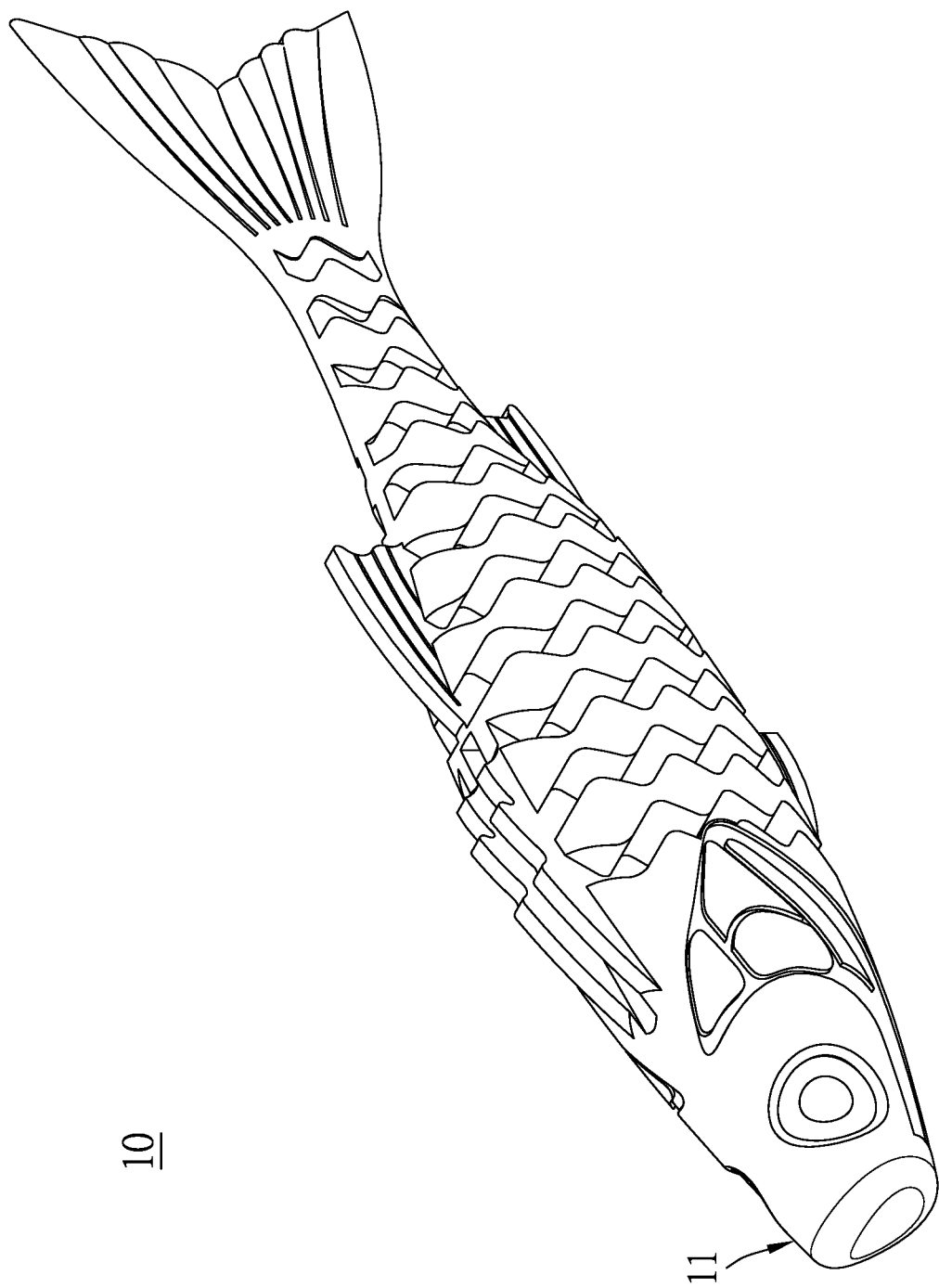
FIG. 7 is a schematic diagram of a bionic bait according to an embodiment of the present invention.

In this embodiment, the bait body 10 further includes a resistance member 18, which is disposed at the front end of the imitation head 11 to increase the resistance to which the front end of the bait body 10 is subjected, thereby increasing the swing amplitude of the bionic bait from side to side; and the resistance member 18 is in sheet shape. However, the invention is not limited to this embodiment. In other embodiments, the resistance member 18 in FIG. 3 can be omitted, as shown in the imitation head 11 of the bait body 10 in FIG. 7.

The bait body 10 further includes at least one accommodation groove for accommodating attractive substances. In this embodiment, accommodation grooves 191 and 192 are respectively disposed at the top and bottom of the imitation trunk 12. Specifically, the accommodation groove 191 is located between two separated dorsal fin pieces 142 of the imitation dorsal fin 14, and the two dorsal fin pieces 142 are located in a front dorsal fin section 141 of the imitation dorsal fin 14; the accommodation groove 192 is partially located between two separated pelvic fin pieces 151 of the imitation pelvic fin 15; and however, the invention is not limited to this embodiment.

In this embodiment, the bait body 10 is made of elastic material; and however, the present invention is not limited to this embodiment.

In the invention, at least one selected from the imitation head 11, the imitation tail fin 13, the imitation dorsal fin 14, the imitation pelvic fin 15, the imitation anal fin 16 and the pair of imitation pectoral fins 17 can be selectively omitted according to actual needs.

The state of the bionic bait of the present invention when in use will be described below.

When the bionic bait bends with the flow, the bending position moves in the transverse direction L2 and the adjacent ribs 123 at the bending position abut against each other. Specifically, when a first rib 123A and an second rib 123B adjacent to the first rib 123A in the bending position abut against each other, the first upper support surface 1261 of at least one of the first protrusions 126 of the first rib 123A abuts against the second lower support surface 1282 of at least one of the second protrusions 128 of the second rib 123B, and/or the first lower support surface 1262 of at least one of the first protrusions 126 of the first rib 123A abuts against the second upper support surface 1281 of at least one of the second protrusions 128 of the second rib 123B.

Since each rib 123 extends from the top of the bionic bait to the bottom of the bionic bait, these ribs 123 can provide support in the longitudinal direction L1, whereby a portion of the spine sheet 121 on which a respective rib 123 is located will not be excessively twisted, so as to prevent the imitation trunk 12 from excessive sagging. In addition, since on the same side, all the first protrusions 126 of the first rib 123A located in the bending position are allowed to respectively enter into all the second valleys 129 of the second rib 123B located in the bending position, and all the second protrusions 128 of the second rib 123B located in the bending position are also allowed to enter into all the first valleys 127 of the first rib 123A located in the bending position, at least a part of the first surface 124 of the first rib 123A abuts against the second surface 125 of the second rib 123B, thereby providing a limit in the transverse direction L2 to limit the swing amplitude of the bionic bait. If the spacing between the first rib 123A and the adjacent second rib 123B is further designed, the swing amplitude of the bionic bait can also be adjusted. Further, if the first upper support surface 1261 of one or more of the first protrusions 126 in the bending position abuts against the second lower support surface 1282 of one or more of the second protrusions 128 of the second rib 123B, and/or the first lower support surface 1262 of one or more of the first protrusions 126 of the first rib 123A abuts against the second upper support surface 1281 of one or more of the second protrusions 128 of the second rib 123B, not only more support forces in the longitudinal direction L1 but also a more serous limit in the longitudinal direction L1 will be provided. In this way, not only can the rear half of the bionic bait not sag excessively in the longitudinal direction L1, but also can the bionic bait swing more naturally in the transverse direction L2 and be more like a live fish naturally swinging in the water; and the same effect can still be achieved even if the length of the bionic bait in the transverse direction L2 is relatively long. In addition, when the flow strikes the first surface 124 of each rib 123, the respective rib 123 provides a greater resistance, which is conducive to increasing the swing frequency of the bionic bait in the transverse direction L2, whereby the bionic bait is more like a live fish naturally swinging in the water.

Although the invention is disclosed as above with the aforementioned embodiments, these embodiments are not intended to limit the invention. Without departing from the spirit and scope of the invention, the combination of modifications, retouching and various embodiments belongs to the scope of patent protection of the invention. For the scope of protection defined by the invention, please refer to the attached claims.

What is claimed is:

1. A bionic bait comprising:
a bait body including an imitation trunk, the imitation trunk including a spine sheet and a plurality of ribs at each of two opposite lateral surfaces of the spine sheet, each of the plurality of ribs extending along a longitudinal direction and including, in a transverse direction, a first surface and a second surface opposite to the first surface, the first surface being provided with a plurality of first protrusions and a first valley between every two adjacent ones of the plurality of first protrusions, and the second surface being provided with a plurality of second protrusions and a second valley between every two adjacent ones of the plurality of second protrusions, wherein the first plurality of protrusions of each of the plurality of ribs are capable of entering into the second valleys of an adjacent one of the plurality of ribs, the first valleys of each of the plurality of ribs allow the plurality of second protrusions of an adjacent one of the plurality of ribs to enter thereinto, and each of the plurality of ribs allows an adjacent one of the plurality of ribs to rest thereon.

2. The bionic bait as claimed in claim 1, wherein each of the plurality of first protrusions includes a first upper support surface and a first lower support surface, an angle between the first upper support surface and the first lower support surface is greater than 0 degree and less than 180 degrees, each of the plurality of second protrusions includes a second upper support surface and a second lower support surface, and an angle between the second upper support surface and the second lower support surface is greater than 0 degree and less than 180 degrees; and two adjacent ones of the plurality of ribs are defined as a first rib and a second rib, and when the first rib and the second rib abut against each other, the first upper support surface of at least one of the plurality of first protrusions of the first rib abuts against the second lower support surface of at least one of the plurality of second protrusions of the second rib or the first lower support surface of at least one of the plurality of first protrusions of the first rib abuts against the second upper support surface of at least one of the plurality of second protrusions of the second rib.

3. The bionic bait as claimed in claim 1, wherein the bait body further includes an imitation head disposed at a front end of the imitation trunk.

4. The bionic bait as claimed in claim 3, wherein the bait body further includes a resistance member, which is disposed to the imitation head.

5. The bionic bait as claimed in claim 3, wherein the bait body further includes at least one selected from an imitation tail fin, an imitation dorsal fin, an imitation pelvic fin, an imitation anal fin and a pair of imitation pectoral fins, the imitation dorsal fin is disposed on a top of the imitation trunk, the imitation tail fin is disposed at a rear end of the imitation trunk, the imitation pelvic fin and the imitation anal fin are disposed at a bottom of the imitation trunk, and the pair of imitation pectoral fins is respectively disposed at two opposite sides of the imitation trunk.

6. The bionic bait as claimed in claim 1, wherein the bait body further includes at least one accommodation groove.

7. The bionic bait as claimed in claim 6, wherein the accommodation groove is located in the imitation trunk.

8. The bionic bait as claimed in claim 7, wherein the bait body further includes an imitation dorsal fin, the imitation dorsal fin is disposed on a top of the imitation trunk and includes two dorsal fin pieces, and the accommodation groove is disposed at the top of the trunk and at least partially located between the two dorsal fin pieces.

9. The bionic bait as claimed in claim 7, wherein the bait body further includes an imitation pelvic fin, the imitation pelvic fin is located at a bottom of the imitation trunk and includes two pelvic fin pieces, and the accommodation groove is located at the bottom of the imitation trunk and at least partially located between the two pelvic fin pieces.

10. The bionic bait as claimed in claim 1, wherein the bait body is made of elastic material.

* * * * *